United States Patent
Okabe et al.

(10) Patent No.: US 10,083,686 B2
(45) Date of Patent: Sep. 25, 2018

(54) ANALYSIS OBJECT DETERMINATION DEVICE, ANALYSIS OBJECT DETERMINATION METHOD AND COMPUTER-READABLE MEDIUM

(71) Applicant: NEC Corporation, Minato-ku, Tokyo (JP)

(72) Inventors: Koji Okabe, Tokyo (JP); Yoshifumi Onishi, Tokyo (JP); Makoto Terao, Tokyo (JP); Masahiro Tani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/436,159

(22) PCT Filed: Sep. 19, 2013

(86) PCT No.: PCT/JP2013/075242
§ 371 (c)(1),
(2) Date: Apr. 16, 2015

(87) PCT Pub. No.: WO2014/069120
PCT Pub. Date: May 8, 2014

(65) Prior Publication Data
US 2015/0287402 A1    Oct. 8, 2015

(30) Foreign Application Priority Data
Oct. 31, 2012    (JP) .................................. 2012-240742

(51) Int. Cl.
*G10L 17/00* (2013.01)
*G10L 15/08* (2006.01)
(Continued)

(52) U.S. Cl.
CPC .............. *G10L 15/08* (2013.01); *G10L 21/06* (2013.01); *G10L 25/45* (2013.01); *G10L 25/48* (2013.01);
(Continued)

(58) Field of Classification Search
CPC ........... H04M 3/56; H04N 7/15; H04N 7/152; H04N 7/155; H04N 7/157; G10L 21/06;
(Continued)

(56) References Cited

U.S. PATENT DOCUMENTS 7,366,671 B2 *  4/2008  Xu ........................ G06F 17/289
                                                  704/231
7,627,475 B2 * 12/2009  Petrushin ................ G10L 17/26
                                                  704/231
(Continued)

FOREIGN PATENT DOCUMENTS

JP    H11-119791 A    4/1999
JP    2004-037989 A   2/2004
(Continued)

OTHER PUBLICATIONS

International Search Report for PCT Application No. PCT/JP2013/075242, dated Nov. 12, 2013.
(Continued)

*Primary Examiner* — Richard Zhu

(57) ABSTRACT

An analysis object determination device includes a detection unit which detects a plurality of specific utterance sections using data related to a voice in a conversation, the specific utterance sections representing a plurality of specific events originating from one or a plurality of participants in the conversation, or a specific event originating from one of the conversation participants, and an object determination unit which determines, on the basis of the plurality of specific utterance sections detected by the detection unit, one or more cause analysis sections for the specific event originating from the conversation participant, the number of the cause analysis sections being fewer than the number of the plurality of specific utterance sections.

15 Claims, 9 Drawing Sheets

(51) Int. Cl.
*G10L 25/45* (2013.01)
*G10L 21/06* (2013.01)
*H04M 3/493* (2006.01)
*H04M 3/51* (2006.01)
*G10L 25/48* (2013.01)
*G10L 15/05* (2013.01)
*G10L 15/04* (2013.01)
*G10L 25/63* (2013.01)
*G10L 15/26* (2006.01)

(52) U.S. Cl.
CPC ....... *H04M 3/4936* (2013.01); *H04M 3/5166* (2013.01); *G10L 15/04* (2013.01); *G10L 15/05* (2013.01); *G10L 15/26* (2013.01); *G10L 25/63* (2013.01); *G10L 2015/088* (2013.01)

(58) Field of Classification Search
CPC ......... G10L 15/26; G10L 15/04; G10L 15/05; G10L 25/45
See application file for complete search history.

(56) References Cited

U.S. PATENT DOCUMENTS

| | | | | |
|---|---|---|---|---|
| 8,457,611 | B2* | 6/2013 | Hwang | G10L 21/06 455/412.1 |
| 8,843,368 | B2* | 9/2014 | Kim | G10L 15/265 704/231 |
| 9,105,042 | B2* | 8/2015 | Sylves | G06Q 30/0201 |
| 2001/0037202 | A1* | 11/2001 | Yamada | G10L 13/10 704/258 |
| 2005/0165604 | A1* | 7/2005 | Hanazawa | G10L 15/05 704/201 |
| 2007/0067174 | A1* | 3/2007 | Verma | G10L 15/26 704/276 |
| 2007/0118374 | A1* | 5/2007 | Wise | G10L 15/26 704/235 |
| 2010/0114575 | A1* | 5/2010 | Itoh | G10L 15/26 704/251 |
| 2010/0332287 | A1 | 12/2010 | Gates et al. | |
| 2011/0217021 | A1* | 9/2011 | Dubin | H04N 7/147 386/278 |

FOREIGN PATENT DOCUMENTS

| | | |
|---|---|---|
| JP | 2010-134233 A | 6/2010 |
| JP | 2011-210100 A | 10/2011 |
| JP | 2011-237957 A | 11/2011 |
| JP | 2012-090337 A | 5/2012 |
| WO | 20100041507 A1 | 1/2008 |

OTHER PUBLICATIONS

English Translation of written opinion for PCT Application No. PCT/JP2013/075242.
Japanese Office Action for JP Application No. 2014-544378 dated Oct. 31, 2017 with English Translation.
Japanese Office Action for JP Application No. 2014-544378 dated May 22, 2018 with English Translation.

* cited by examiner

Fig. 9

| | | OP/CU | DETAIL OF UTTERANCE |
|---|---|---|---|
DATE AND TIME OF CALL: 03/13 12:54
SUBJECT OF INQUIRY: KEYBOARD HAS FAILED
RESULT OF NARROWING DOWN: [1] [2]

| | | OP/CU | DETAIL OF UTTERANCE |
|---|---|---|---|
| 0159 | 580.4 | OP | xxxxxxxxxxxxx |
| 0160 | 582.0 | OP | xxxxxxxxxxxxxxx |
| 0161 | 585.5 | OP | xxxxxxxxxxxxxxxx |
| 0162 | 588.8 | CU | xxxxxxxxxxxxxx |
| 0163 | 589.8 | OP | WHY |
| 0164 | 591.2 | CU | xxxxxxxxxxxxxxx |
| 0165 | 594.5 | CU | xxxxxxxxxxxxxxx |
| 0166 | 594.8 | OP | xxxxxxxxxxxx |
| 0167 | 597.4 | CU | AND HOW MUCH WILL IT COST TO REPAIR? |
| 0168 | 601.2 | OP | WELL, PRESUMABLY IT WOULD COST ABOUT 20,000 YEN |
| 0169 | 601.3 | CU | THAT MUCH? |
| 0170 | 609.2 | OP | YES, I AM VERY SORRY |
| 0171 | 611.6 | CU | BUT, YOU KNOW, IT'S BEEN VERY SHORT SINCE I BOUGHT IT |
| 0172 | 613.2 | CU | |
| 0173 | 614.8 | CU | |
| 0174 | 617.3 | OP | IS THAT SO |

G82
G81
G81-1 G81-2
G81-3
G81-5

ANALYSIS OBJECT DETERMINATION DEVICE, ANALYSIS OBJECT DETERMINATION METHOD AND COMPUTER-READABLE MEDIUM

This application is a National Stage Entry of PCT/JP2013/075242 filed on Sep. 19, 2013, which claims priority from Japanese Patent Application 2012-240742 filed on Oct. 31, 2012, the contents of all of which are incorporated herein by reference, in their entirety.

TECHNICAL FIELD

The present invention relates to a conversation analysis technique.

BACKGROUND ART

Techniques of analyzing conversations include a conversation analysis technique. The conversation analysis technique is utilized, for example, for analyzing data of phone conversations made in a section called call center or contact center. Hereinafter, the section specialized in dealing with phone calls from customers made for inquiries, complaints, and orders about merchandise or service will be referred to as contact center.

In many cases the voice of the customers directed to the contact center reflect the customers' needs and satisfaction level. Therefore, it is essential to extract the emotion and needs of the customer on the bases of phone conversations with the customers, in order to increase the number of repeating customers. The phone conversations from which it is desirable to extract the emotion and other factors of the speaker are not limited to those exchanged in the contact center.

According to a method proposed in Patent Literature (PTL) 1, store clerk utterance sections are identified from the voice of the phone conversation. Then an employee satisfaction level is calculated with respect to each of the store clerk utterance sections based on emotion recognition, and a general satisfaction level is calculated on the basis of the calculated employee satisfaction level. According to a method proposed in PTL 2, voice keywords are extracted from store clerk accosting sections through voice recognition with respect to data recorded while the store clerk is attending a customer. Then customer accosting sections are identified on the basis of collection timing associated with the voice keywords, and the emotion recognition is performed with respect to voice data of the identified customer accosting sections.

CITATION LIST

Patent Literature

[PTL 1] Japanese Patent Application Laid-Open No. 2011-237957
[PTL 2] Japanese Patent Application Laid-Open No. 2011-210100

SUMMARY OF INVENTION

Technical Problem

With the mentioned methods, the customer accosting section in a specific temporal relationship with the store clerk utterance section or store clerk accosting section can be identified. However, a conversation (phone conversation) often contains many of such sections. For example, even when only anger is to be extracted as customer's emotion, a plurality of utterance sections in which the customer is expressing anger are often contained in the conversation in which the customer is feeling dissatisfied.

With the foregoing methods, to trace causes of a specific emotion or specific behavior of the person participating in the conversation (hereinafter, conversation participant), it is necessary to analyze the plurality of sections identified as above. Therefore, efficient analysis is unable to be performed by the proposed methods.

The present invention has been accomplished in view of the foregoing problem. The present invention provides a technique for improving cause analysis efficiency with respect to a specific emotion or specific behavior of a participant in a conversation.

Solution to Problem

Some aspects of the present invention are configured as follows, to solve the foregoing problem.

A first aspect of the present invention relates to an analysis object determination device. The analysis object determination device according to the first aspect includes a detection unit which detects a plurality of specific utterance sections using data related to a voice in a conversation, the specific utterance sections representing a plurality of specific events originating from one or a plurality of participants in the conversation, or a specific event originating from one of the conversation participants, and an object determination unit which determines, on the basis of the plurality of specific utterance sections detected by the detection unit, one or more cause analysis sections for the specific event originating from the conversation participant, the number of the cause analysis sections being fewer than the number of the plurality of specific utterance sections.

A second aspect of the present invention relates to an analysis object determination method executed with at least one computer. The analysis object determination method according to the second aspect includes detecting a plurality of specific utterance sections using data related to a voice in a conversation, the specific utterance sections representing a plurality of specific events originating from one or a plurality of participants in the conversation, or a specific event originating from one conversation participant, and determining, on the basis of the plurality of specific utterance sections detected by the detection unit, one or more cause analysis sections for the specific event originating from the conversation participant, the number of the cause analysis sections being fewer than the number of the plurality of specific utterance sections.

Other aspects of the present invention may include a program that causes at least one computer to realize the configuration according to the first aspect, or a computer-readable recording medium having the mentioned program recorded thereon. The recording medium includes a tangible non-transitory medium.

Advantageous Effects of Invention

With the foregoing aspects of the present invention, a technique for improving cause analysis efficiency with respect to a specific emotion or specific behavior of a participant in a conversation can be provided.

BRIEF DESCRIPTION OF DRAWINGS

These and other objects, features, and advantages will become more apparent through exemplary embodiments described hereunder with reference to the accompanying drawings.

FIG. 9 is a schematic drawing showing an example of call detail confirmation screen according to example 1.

DESCRIPTION OF EMBODIMENTS

Figure 1:
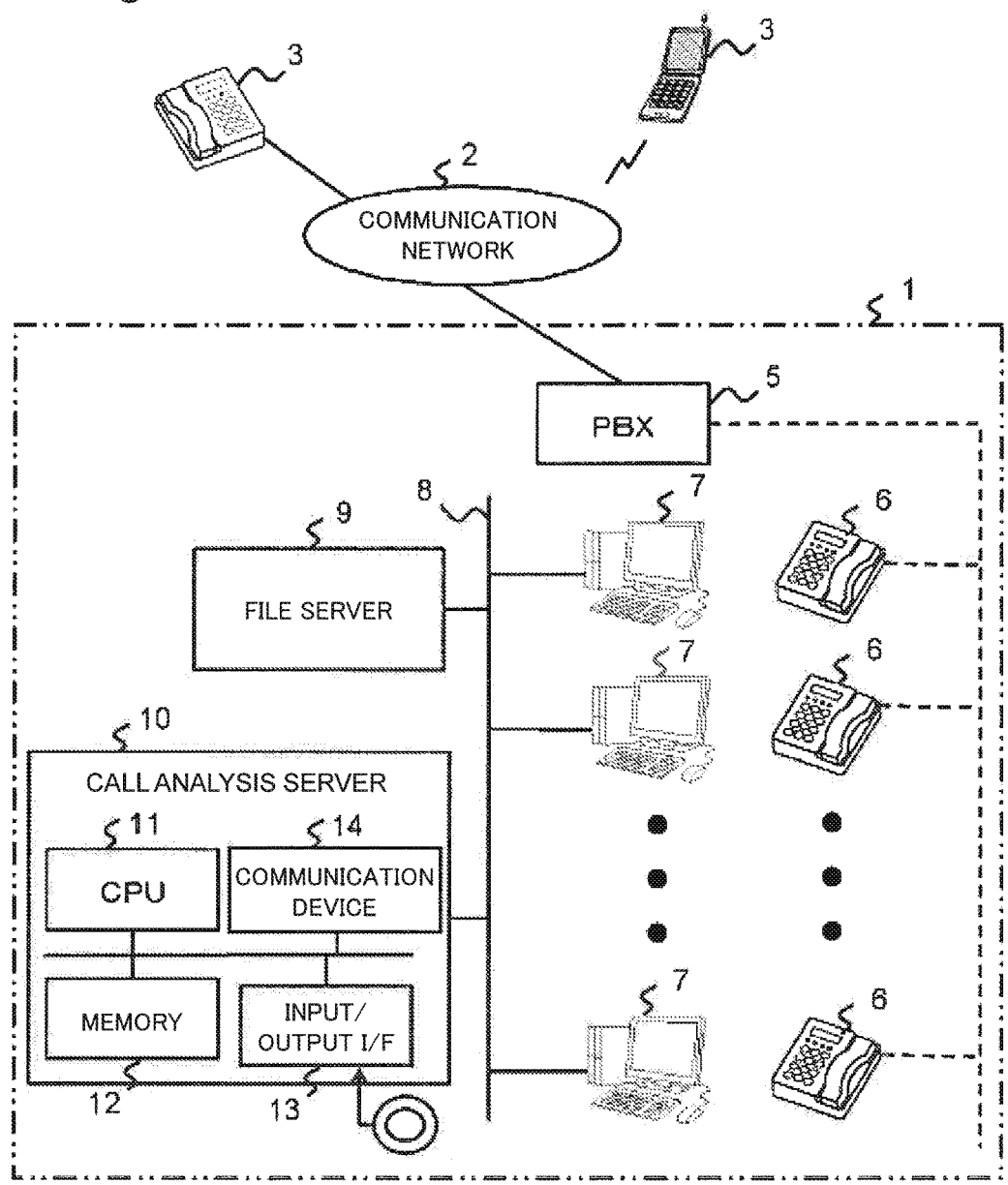
FIG. 1 is a schematic drawing showing a configuration example of a contact center system according to a first exemplary embodiment.

Hereafter, exemplary embodiments of the present invention will be described. The following exemplary embodiments are merely examples, and the present invention is in no way limited to the configuration according to the following exemplary embodiments.

An analysis object determination device this exemplary embodiment includes a detection unit and an object determination unit. The detection unit detects a plurality of specific utterance sections using data related to a voice in a conversation. The specific utterance sections represent a plurality of specific events originating from one or a plurality of participants in the conversation, or a specific event originating from one of the conversation participants. The object determination unit determines, on the basis of the plurality of specific utterance sections detected by the detection unit, one or more cause analysis sections for the specific event originating from the conversation participant. The number of the cause analysis sections is fewer than the number of the plurality of specific utterance sections.

An analysis object determination method according to this exemplary embodiment is executed with at least one computer, and includes detection and determination. The detection includes detecting a plurality of specific utterance sections using data related to a voice in a conversation. The specific utterance sections represent a plurality of specific events originating from one or a plurality of participants in the conversation, or a specific event originating from one of the conversation participants. The determination includes determining, on the basis of the plurality of specific utterance sections detected by the detection unit, one or more cause analysis sections for the specific event originating from the conversation participant. The number of the cause analysis sections is fewer than the number of the plurality of specific utterance sections.

The conversation refers to a situation where two or more speakers talk to each other to declare what they think, through verbal expression. The conversation may include a case where the conversation participants directly talk to each other, for example at a bank counter or at a cash register of a shop. The conversation may also include a case where the conversation participants located away from each other talk, for example a conversation over the phone or a TV conference. Regarding the series of voices in the conversation, a continuous region where one of the conversation participants is speaking will be referred to as utterance or utterance section. For example, a section where an amplitude wider than a specific value is maintained in the voice waveform of the conversation participant is detected as utterance section. Normally, the conversation is formed by the utterance sections and silent sections produced by each of the conversation participants. Here, the voice may also include a sound created by a stuff other than human, in addition to the voice of the participants. Therefore, a sound section may also constitute the utterance and the utterance section.

In this exemplary embodiment, the plurality of specific utterance sections are detected by using the data related to the conversation voice. The plurality of specific utterance sections are detected out of all the utterance sections constituting the conversation. The detected utterance sections represent a specific event originating from one of the conversation participants, a plurality of specific events originating from the one conversation participant, or a plurality of specific events originating from the plurality of conversation participants. The specific event refers to the specific event originating from the conversation participant with respect to whom the cause analysis is to be performed. The specific event also refers to the specific event associated with the mentioned specific event, originating from the mentioned conversation participant or other conversation participants. To be more detailed, the specific event includes a specific emotion or specific behavior of the conversation participant. The specific event also includes a specific emotion or specific behavior that other conversation participants feel (act) triggered by the mentioned specific emotion or specific behavior of the conversation participant.

The specific emotion includes at least one of mental conditions that a person may feel, for example anger, dissatisfaction, satisfaction, interest, and being moved. The specific behavior includes at least one of actions of a human triggered by the specific emotion and performed with a voice or sound, for example apologizing, disconnecting the phone conversation, striking a desk, and smacking. An example of the specific utterance section is a section in which the conversation participant is expressing an interest. In this case, for example, a section representing a high-tone utterance "Is that true?" of the conversation participant is detected as specific utterance section. Another example is an utterance section in which the conversation participant is apologizing, in which case, for example, a section where the conversation participant is saying "I am very sorry" is detected as specific utterance section. This exemplary embodiment is not intended to limit the specific emotion and the specific behavior to the mentioned examples.

In many cases, a plurality of such specific utterance sections are contained in the conversation in which the conversation participants are producing the specific events. Accordingly, it is not efficient to analyze all of the specific utterance sections that have been detected. In this exemplary embodiment, therefore, a fewer number of cause analysis sections for the specific event originating from the conversation participant are determined, than the number of the plurality of specific utterance sections detected as above. Such determination is made on the basis of the plurality of specific utterance sections detected. There are a plurality of methods to determine a fewer number of cause analysis sections than the number of detected specific utterance sections on the basis thereof. Therefore, the cause analysis sections can be determined by the plurality of methods in combination with known methods, as will be subsequently described with reference to detailed exemplary embodiments and examples.

Thus, according to this exemplary embodiment, the analysis is not performed with respect to all of the specific utterance sections. Instead, only the sections that are highly likely to contain the cause presumed on the basis of all those specific utterance sections are picked up as object of analysis. Therefore, the efficiency of the cause analysis can be improved.

Hereunder, the foregoing exemplary embodiment will be described in further details. A first exemplary embodiment will be described below, as one of the detailed exemplary embodiments. The following exemplary embodiment represents the case where the foregoing analysis object determination device and the analysis object determination method are applied to a contact center system. In the following detailed exemplary embodiment, therefore, a phone conversation in the contact center between a customer and an operator is cited as object of analysis. Accordingly, the conversation participants are the speakers on the phone, namely the customer and the operator. In the following detailed exemplary embodiment, in addition, the specific emotion to be analyzed is exemplified by dissatisfaction (anger) of the customer. As a matter of course, the specific emotion utilized for the cause analysis is not limited to the setting according to this exemplary embodiment. For example, other types of specific emotion, such as satisfaction of the customer, degree of interest of the customer, or stressful feeling of the operator, may be adopted as object of cause analysis.

The analysis object determination device and the analysis object determination method are not only applicable to the contact center system that handles call data, but also to various systems that handle the call data. For example, the analysis object determination device and method are applicable to a phone conversation management system of the company other than the contact center. In addition, the device and method for analysis object determination are applicable to a personal computer (PC) and a terminal such as a landline phone, a mobile phone, a tablet terminal, or a smartphone, which are privately owned. Further, examples of the call data include data representing a conversation between a clerk and a customer at a bank counter or a cash register of a shop. Hereafter, the call will refer to a speech made between a speaker and another speaker, during a period from connection of the phones of the respective speakers to disconnection thereof.

[First Exemplary Embodiment]
[System Configuration]

FIG. 1 is a schematic drawing showing a configuration example of the contact center system according to a first exemplary embodiment. The contact center system 1 according to the first exemplary embodiment includes a switchboard (PBX) 5, a plurality of operator phones 6, a plurality of operator terminals 7, a file server 9, and a call analysis server 10. The call analysis server 10 includes a configuration corresponding to the analysis object determination device of the foregoing exemplary embodiment.

The switchboard 5 is communicably connected to a terminal (customer phone) 3 utilized by the customer, such as a PC, a landline phone, a mobile phone, a tablet terminal, or a smartphone, via a communication network 2. The communication network 2 is, for example, a public network or a wireless communication network such as the internet or a public switched telephone network (PDTN). The switchboard 5 is connected to each of the operator phones 6 used by the operators of the contact center. The switchboard 5 receives a call from the customer and connects the call to the operator phone 6 of the operator who has picked up the call.

The operators respectively utilize the operator terminals 7. Each of the operator terminals 7 is a general-purpose computers such as a PC connected to a communication network 8, for example as a local area network (LAN), in the contact center system 1. The operator terminals 7 each record, for example, voice data of the customer and voice data of the operator in the phone conversation between the operator and the customer. The voice data of the customer and the voice data of the operator may be generated from mixed voices through a specific speech processing method. Here, this exemplary embodiment is not intended to limit the recording method and recording device of the voice data. The voice data may be generated by another device (not shown) than the operator terminal 7.

The file server 9 is composed of a generally known server computer. The file server 9 stores the call data representing the phone conversation between the customer and the operator, together with identification information of the call. The call data includes time information and pairs of the voice data of the customer and the voice data of the operator. The voice data may include sounds inputted through the customer phone 3 and the operator terminal 7, in addition to the voices of the customer and the operator. The file server 9 acquires the voice data of the customer and the voice data of the operator from other devices that record the voices of the customer and the operator, for example the operator terminals 7.

The call analysis server 10 analyzes each of the call data stored in the file server 9, and outputs an analysis result according to the requirement of the user. The call analysis server 10 may display the analysis result on its own display device, or on the browser of the user terminal using a WEB server function.

The call analysis server 10 has, as shown in FIG. 1, a hardware configuration including a central processing unit (CPU) 11, a memory 12, an input/output interface (I/F) 13, and a communication device 14. The memory 12 may be, for example, a random access memory (RAM), a read only memory (ROM), a hard disk, or a portable storage medium. The input/output I/F 13 is connected to a device that accepts inputs from the user such as a keyboard or a mouse, a display device, and a device that provides information to the user such as a printer. The communication device 14 makes communication with the file server 9 through the communication network 8. However, the hardware configuration of the call analysis server 10 is not specifically limited.

[Configuration for Processing]

Figure 2:
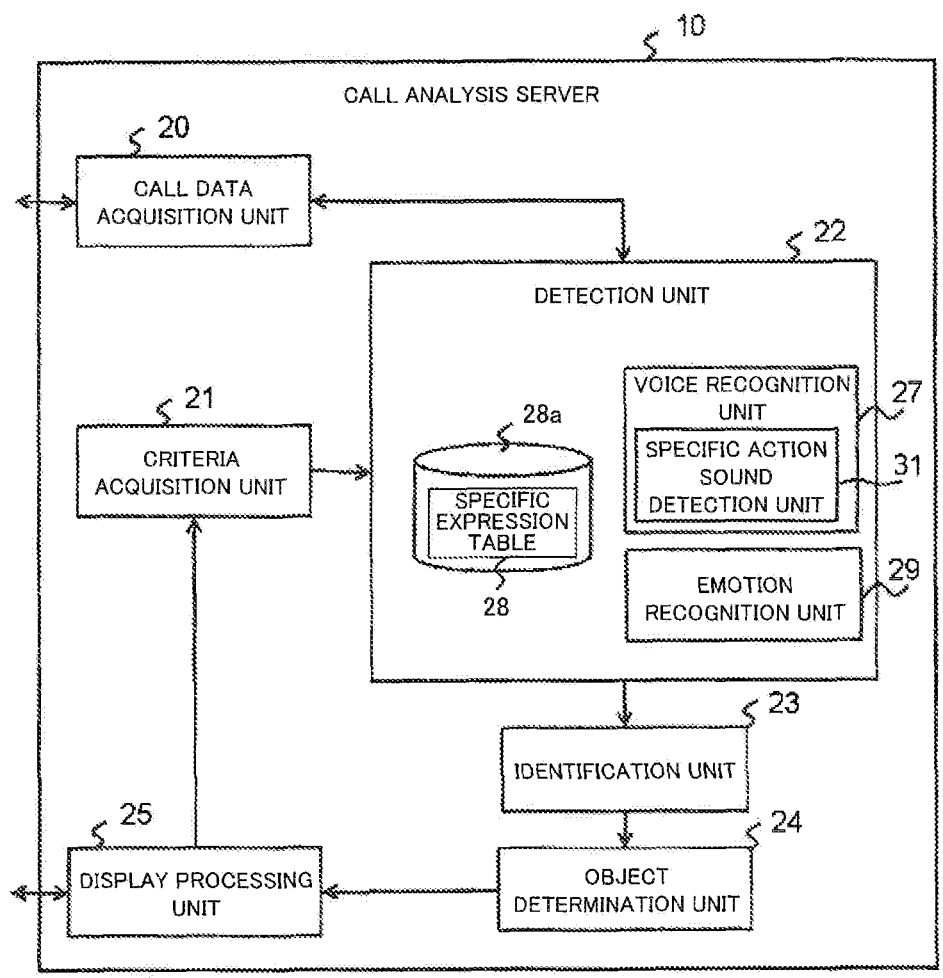
FIG. 2 is a block diagram showing a configuration example of a call analysis server according to the first exemplary embodiment.

FIG. 2 is a block diagram showing a configuration example of the call analysis server 10 according to the first exemplary embodiment. The call analysis server 10 according to the first exemplary embodiment includes a call data acquisition unit 20, a criteria acquisition unit 21, a detection unit 22, an identification unit 23, an object determination unit 24, and a display processing unit 25. These processing units may be realized, for example, by the CPU 11 upon executing the program stored in the memory 12. Here, the program may be installed and stored in the memory 12, for example from a portable recording medium such as a compact disc (CD) or a memory card, or another computer on the network, through the input/output I/F 13.

The call data acquisition unit 20 acquires, from the file server 9, the call data of a plurality of calls to be analyzed, together with the identification information of the corresponding call. The plurality of call data may be acquired through the communication between the call analysis server 10 and the file server 9, or through a portable recording medium.

The criteria acquisition unit 21 acquires at least one of call search criteria for narrowing down the calls to be analyzed and section search criteria for identifying the specific utterance section, from the display processing unit 25. The section search criteria also serves as criteria for excluding a call from which the specific utterance section has not been detected. The specific utterance section is an utterance section in the plurality of utterance sections contained in the call, which serves as a base for determining an analysis section for analyzing the dissatisfaction of the customer.

The call search criteria and the section search criteria may be designated as a plurality of conditions. For example, one of a keyword, an expression, and a sound accompanying a specific behavior of the speaker may each be designated as one of the call search criteria. In addition, each of the specific events of each speaker described in the foregoing exemplary embodiment may be designated as one of the section search criteria. In other words, a specific emotion or a specific behavior, and the subject thereof may each be designated as the section search criteria. Since the object of analysis is the dissatisfaction of the customer in this exemplary embodiment, various events representing the dissatisfaction of the customer may each be designated as call search criteria. In addition, for example, the emotion of anger (dissatisfaction) of the customer and the apology of the operator may each be designated as section search criteria. However, this exemplary embodiment is not intended to limit the call search criteria itself or the section search criteria itself.

When the call search criteria are acquired through the criteria acquisition unit 21, the detection unit 22 extracts the call data that matches all of the call search criteria as object of analysis, out of the plurality of call data acquired through the call data acquisition unit 20. In addition, when the section search criteria are acquired through the criteria acquisition unit 21, the detection unit 22 extracts the specific utterance sections that match the section search criteria, out of the call data that matches all of the call search criteria. Then the detection unit 22 excludes the call data that do not contain the specific utterance section from the object of analysis.

The detection unit 22 includes a voice recognition unit 27, a specific expression table 28, and an emotion recognition unit 29. The specific expression table 28 is stored in a specific expression memory 28*a*. These processing units are also realized, like other processing units, by execution of the relevant program. The detection unit 22 extracts the call data that matches the call search criteria and detect the specific utterance sections that match the section search criteria, by activating at least one of the voice recognition unit 27 and the emotion recognition unit 29.

The detection unit 22 may detect the utterance sections of the operator and the customer from the voice data contained in the call data, before activating at least one of the voice recognition unit 27 and the emotion recognition unit 29. As a result of such detection, the detection unit 22 acquires the start time and finish time of each of the utterance sections. In this exemplary embodiment, the detection method of the utterance section is not specifically limited. For example, the utterance section may be detected through the voice recognition performed by the voice recognition unit 27. Alternatively, the call data acquisition unit 20 may acquire information of the utterance section in the call data, together with the call data. Here, the utterance section of the operator may include a sound inputted through the operator terminal 7, and the utterance section of the customer may include a sound inputted through the customer phone 3.

The voice recognition unit 27 recognizes the voice with respect to each of the utterance sections in the voice data of the operator and the customer contained in the call data. Accordingly, the voice recognition unit 27 acquires, from the call data, voice text data and speech time data associated with the operator's voice and the customer's voice. Here, the voice text data refers to character data converted into a text from the voice outputted from the customer or operator. The speech time represents the time when the speech relating to the voice text data has been made, and includes the start time and the finish time of the utterance section from which the voice text data has been acquired. In this exemplary embodiment, the voice recognition may be performed through a known method. The voice recognition process itself and the voice recognition parameters to be employed for the voice recognition are not specifically limited.

The voice recognition unit 27 may include a specific action sound detection unit 31. The specific action sound detection unit 31 recognizes the events representing the dissatisfaction of the customer that may be designated as call search criteria. Examples of such event include a fact that the call has been disconnected halfway, and a phone disconnection sound louder than a specific volume. The specific action sound detection unit 31 may store in advance voice feature information of the disconnection sound to thereby recognize the disconnection sound on the basis of such information. Alternatively, the specific action sound detection unit 31 may recognize the fact that the call has been disconnected halfway, on the basis of the time data of phone disconnection transmitted together with the call data.

The voice recognition unit 27 may identify the call data representing the dissatisfaction of the customer using the voice data, by a known method. This exemplary embodiment is not intended to limit the voice recognition method adopted by the voice recognition unit 27.

The specific expression table 28 contains specific expression data that can be designated according to the call search criteria and the section search criteria. The specific expression data is stored in the form of character data. In addition, the specific expression table 28 holds gratitude expression data and apology expression data as specific expression data, in a form that allows the gratitude expression and the apology expression to be distinguished from each other.

The emotion recognition unit 29 recognizes the emotion with respect to the utterance section in the voice data of at least one of the operator and the customer contained in the call data. Such recognition is performed on the basis of the section search criteria acquired by the criteria acquisition unit 21. The emotion recognition unit 29 acquires prosodic feature information from the voice in each of the utterance sections. The emotion recognition unit 29 then decides whether the utterance section represents the specific event designated according to the section search criteria, by using the prosodic feature information. Examples of the prosodic feature information include a basis frequency and a voice power. In this exemplary embodiment the method of emotion recognition is not specifically limited, and a known method may be employed for the emotion recognition (see reference cited below).

Reference Example: Narichika Nomoto et al., "Estimation of Anger Emotion in Spoken Dialogue Using Prosody and Conversational Temporal Relations of Utterance", Acoustic Society of Japan, Conference Paper of March 2010, pages 89 to 92.

The emotion recognition unit 29 may decide whether the utterance section represents the specific event of the speaker designated according to the section search criteria, using the identification model based on the support vector machine (SVM). To be more detailed, in the case where the "anger of customer" may be designated as section search criteria, the emotion recognition unit 29 may store in advance an identification model. The identification model may be obtained by providing the prosodic feature information of the utterance section representing the "anger" and "normal" as learning data, to allow the identification model to learn to distinguish between the "anger" and "normal". In the case where "normal apology of operator" and "deep apology of operator" may be designated as section search criteria, the emotion recognition unit 29 may store in advance an identification model. The identification model may be obtained by providing the prosodic feature information of the utterance section representing the "normal apology of operator" and "deep apology of operator" as learning data, to allow the identification model to learn to distinguish between the "normal apology" and "deep apology". The emotion recognition unit 29 may select the identification model that matches the acquired section search criteria. Then the emotion recognition unit 29 may decide whether the utterance section represents the specific event of the speaker designated according to the section search criteria, by giving the prosodic feature information of the utterance section to the selected identification model.

For example when "no word of gratitude from the customer" is given as call search criteria, the detection unit 22 extracts the call data in which the voice text data of the utterance sections of the customer, obtained by the voice recognition unit 27, does not include the gratitude expression data stored in the specific expression table 28, as call data that matches the call search criteria. When "disconnection of call halfway" is given as call search criteria, the detection unit 22 determines, with respect to the voice data of the customer, whether the call contains "disconnection" on the basis of the process performed by the voice recognition unit 27. The detection unit 22 then extracts the call data that contains "disconnection", as object of analysis. Further, when "anger of customer" is given as section search criteria, the detection unit 22 identifies the utterance sections from the voice data of the customer, which are determined in the emotion recognition unit 29 as specific utterance section representing "anger". The detection unit 22 also excludes the call data in which the specific utterance section has not been detected, from the object of analysis.

The identification unit 23 identifies at least one reference time point with respect to the specific utterance section in the calls detected by the detection unit 22, by a method appropriate for at least one specific event represented by the specific utterance section. For example, the identification unit 23 possesses identification methods of the reference time point, specified for each of the section search criteria.

With respect to the section search criteria that may allow a plurality of specific utterance sections to be detected, the identification unit 23 employs the following identification method. The identification unit 23 identifies at least one reference time point in a section including combined pairs of first specific utterance sections adjacent to each other, in the plurality of first specific utterance sections representing one specific event of one speaker. Here, the time width between the first specific utterance sections adjacent to each other is shorter than a specific time.

On the other hand, with respect to the specific utterance sections detected by the detection unit 22 on the basis of other section search criteria, the identification unit 23 utilizes such specific utterance sections as they are, to identify the reference time point. When identifying the reference time point, the specific time may be changed for each of the section search criteria. The specific utterance sections detected by the detection unit 22 may be utilized as they are to identify the reference time point, when the specific time is set to zero or null.

The present inventors have discovered the following. When the first specific utterance sections that satisfy one section search criteria, i.e., the specific utterance sections representing one specific event of one conversation participant (speaker) continuously appear, all those specific utterance sections do not necessarily contain the cause of the specific event. The present inventors have led out that the cause of the specific event is likely to lie in the vicinity of a certain time in the plurality of continuous specific utterance sections. It has been led out that, for example when the utterance sections representing the dissatisfaction of the customer (conversation participant) continuously appear, the cause of the dissatisfaction of the customer does not lie in the vicinity of all those utterance sections. It has been further led out that the cause of the dissatisfaction is likely to lie in the vicinity of the head portion of the plurality of continuous utterance sections representing the dissatisfaction. In addition, the cause of feeling of satisfaction may lie in the vicinity of the trailing end of the plurality of continuous utterance sections representing the anger.

The present inventors have also discovered that, though not frequently, the utterance sections in which the cause of the specific event being the object of the cause analysis is likely to lie may be present before or after the mentioned utterance sections. It has been led out that, for example, the utterance sections representing the apology of the conversation participant have such a characteristic. It has also been discovered that the apology of the conversation participant can be classified into light apology and deep apology. Further, the utterance sections representing the deep apology more prominently exhibit the mentioned characteristic than the utterance sections representing the light apology. In this exemplary embodiment, accordingly, the identification unit 23 switches the identification method of the reference time point with respect to each of the section search criteria, as described above. For example, the identification unit 23 identifies the reference time point by the same identification method as for the first specific utterance sections, with respect to the specific utterance sections representing the dissatisfaction of the customer and the light apology of the operator. With respect to the specific utterance sections representing the deep apology of the operator, the identification unit 23 employs the same identification method as for the second specific utterance section, to identify the reference time point. When the first specific utterance sections represent the dissatisfaction of the customer, at least one reference time point is identified on the basis of the first specific utterance section at the head portion of the section including combined pairs of first specific utterance sections adjacent to each other. Here, the time width between the first specific utterance sections adjacent to each other is shorter than the specific time. The switching of the identification method of the reference time point may be performed according to factors other than the relationship between the anger of the customer and the apology of the operator.

In this exemplary embodiment, the identification method of the reference time point based on the first specific utterance section or the second specific utterance section is not limited. For example, the start time or finish time of the specific utterance section may be set as the reference time point, and a selected time point in the specific utterance section may be set as the reference time point. Alternatively, a time obtained by adding a specific time to the selected time point in the specific utterance section may be set as the reference time point. Further, a plurality of time points in the specific utterance section may be respectively set as reference time points, such that the start time of the specific utterance section is set as a reference time point A, and the finish time is set as a reference time point B.

The object determination unit 24 designates a specific time range based on the reference time point identified by the identification unit 23, as cause analysis section for the dissatisfaction of the customer. The cause analysis section may be determined as a specific time range starting from the reference time point, a specific time range ending at the reference time point, or a specific range including the reference time point at the center. When a plurality of reference time points are set, the cause analysis section may be determined as a range starting from a time preceding the reference time point A by a specific time and ending at a time later than the reference time point B by a specific time.

When the plurality of section search criteria are designated, the object determination unit 24 detects an overlapping range between the cause analysis sections determined on the basis of the respective reference time points obtained using the section search criteria. Then the object determination unit 24 determines such an overlapping range as final cause analysis section for the dissatisfaction of the customer in the relevant call. The specific time range for determining the cause analysis section may be set to different values for each of the section search criteria, or set to the same value. The object determination unit 24 then excludes from the object of analysis such call data in which the object determination unit 24 has not finally set the cause analysis section, among the call data extracted by the detection unit 22.

Figure 3:
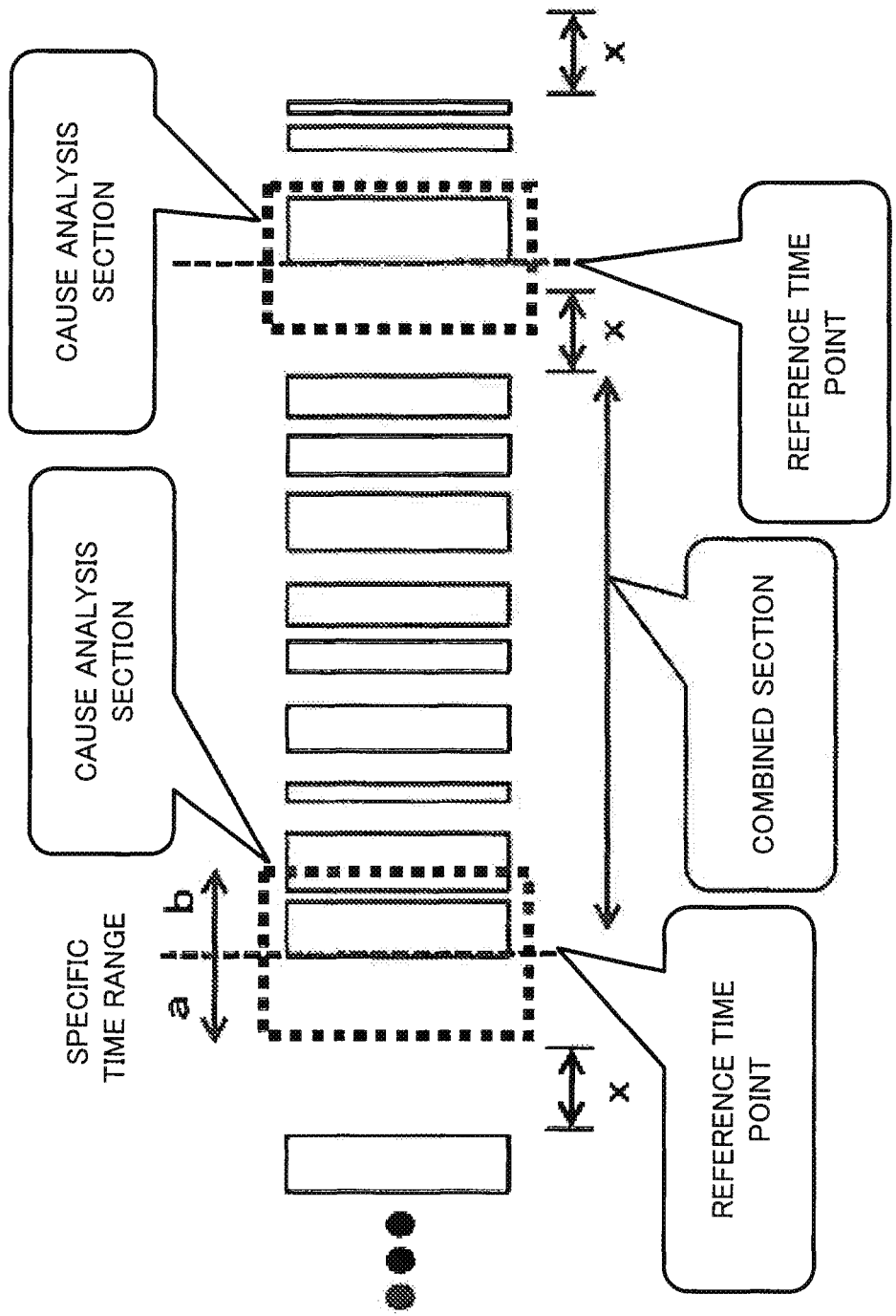
FIG. 3 is a schematic diagram showing a determination process of a cause analysis section according to the first exemplary embodiment.

FIG. 3 is a schematic diagram showing a determination process of the cause analysis section according to the first exemplary embodiment. In FIG. 3, the specific time width for identifying the reference time point is denoted as x, and the specific time range for determining the cause analysis section is denoted as (a+b). In the example shown in FIG. 3, the start time of the specific utterance section at the head portion of the combined sections is set as reference time point. Then a range between a point (a) seconds earlier and a point (b) seconds later than the reference time point is determined as cause analysis section. However, this exemplary embodiment is not intended to limit the determination method of the cause analysis section as above. For example, the time widths (a) and (b) may be the same.

Figure 4:
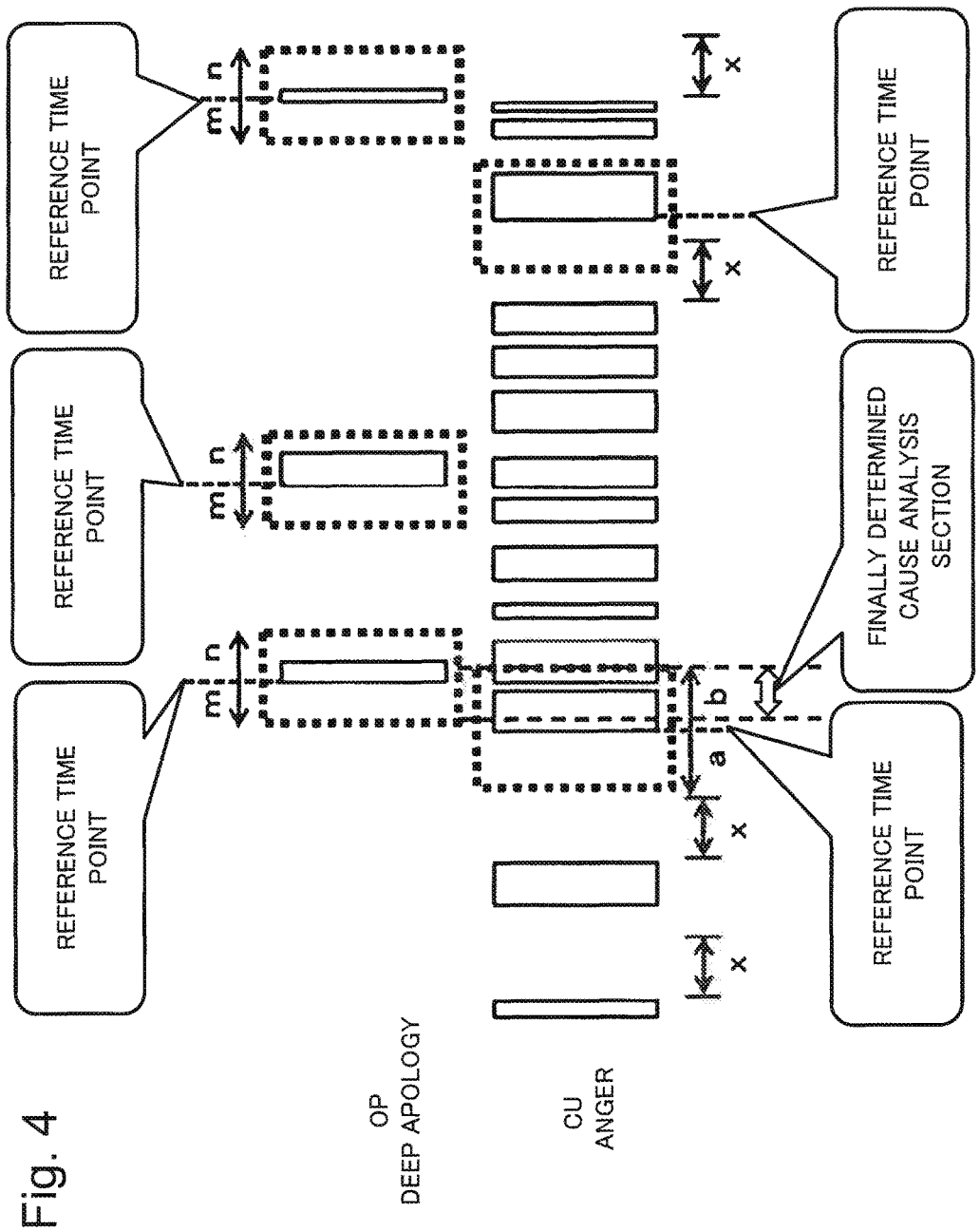
FIG. 4 is another schematic diagram showing a determination process of the cause analysis section according to the first exemplary embodiment.

FIG. 4 is another schematic diagram showing the determination process of the cause analysis section according to the first exemplary embodiment. In the example shown in FIG. 4, a plurality of specific utterance sections are detected and the reference time points are set, with respect to each of two section search criteria namely the anger of the customer (CU) and the deep apology of the operator (OP). In FIG. 4, the time range between a point (a) seconds earlier and a point (b) seconds later than the reference time point is determined as cause analysis section for the anger of the customer. With respect to the deep apology of the operator, the time ranges between a point (m) seconds earlier and a point (n) seconds later than the reference time point are determined as cause analysis section. Then the overlapping range between the analysis section for the anger of the customer and the analysis section of the deep apology of the operator is determined as final cause analysis section for the dissatisfaction of the customer.

The display processing unit 25 generates drawing data in which a plurality of first drawing elements and a second drawing element are each aligned in a chronological order in the call extracted as object of analysis. The first drawing elements respectively represent the plurality of specific utterance sections detected by the detection unit 22, and the second drawing element represents the cause analysis section determined by the object determination unit 24. The display processing unit 25 causes the display device to display an analysis result screen on the basis of such drawing data, the display device being connected to the call analysis server 10 via the input/output I/F 13. The display processing unit 25 may also be given a WEB server function, so as to cause a WEB client device to display the drawing data. Further, the display processing unit 25 causes the display device to display an input screen for the user to designate the call search criteria and the section search criteria. Accordingly, the criteria acquisition unit 21 acquires the call search criteria and the section search criteria designated by the user through the input screen.

[Operation Example]

Figure 5:
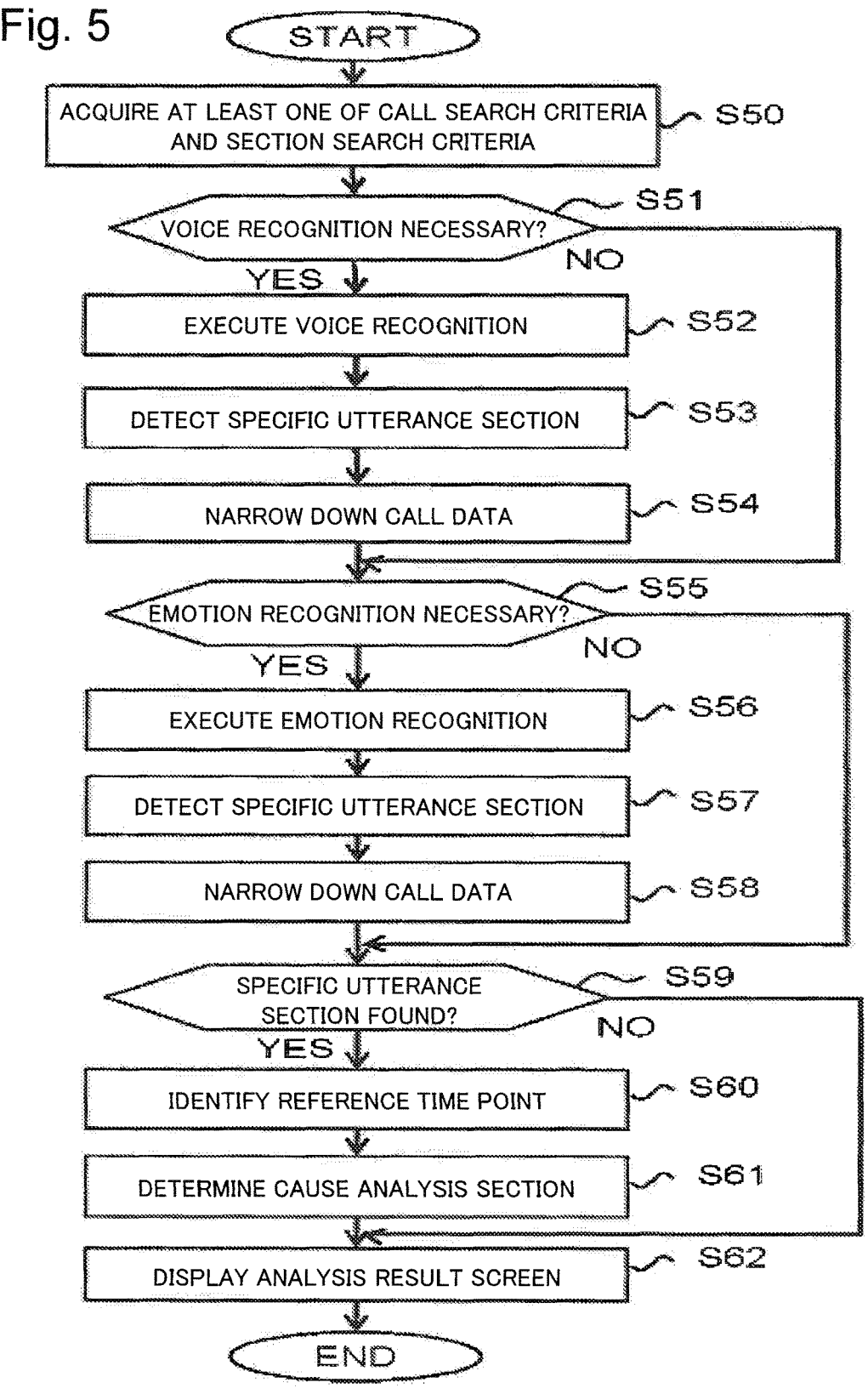
FIG. 5 is a flowchart showing an operation performed by the call analysis server according to the first exemplary embodiment.

Hereunder, the analysis object determination method according to the first exemplary embodiment will be described with reference to FIG. 5. FIG. 5 is a flowchart showing the operation performed by the call analysis server 10 according to the first exemplary embodiment. Here, it is assumed that the call analysis server 10 has already acquired the plurality of call data. For example, the call analysis server 10 has acquired the plurality of call data stored in the file server 9.

The call analysis server 10 acquires at least one of the call search criteria and the section search criteria (S50). The call analysis server 10 causes the display device to display the input screen, thereby acquiring at least one of the call search criteria and the section search criteria inputted through the input screen.

The call analysis server 10 decides whether the voice recognition has to be performed, on the basis of the call search criteria and the section search criteria acquired at S50 (S51). In the call analysis server 10, the information indicating whether the voice recognition has to be performed is stored in advance, with respect to each of the call search criteria and the section search criteria.

The call analysis server 10 performs the voice recognition according to the decision (YES at S51), with respect to the plurality of call data that has been acquired (S53). The voice recognition includes, as described above, acquiring the voice text data from the voice data of each utterance section. The voice recognition also includes detecting, from the voice data, the disconnection of the call halfway and conversation disconnection sound louder than a specific volume, and so forth. The call analysis server 10 determines the specific voice recognition process to be performed, on the basis of the criteria acquired at S50.

The call analysis server 10 detects the specific utterance sections (S53) representing the specific event originating from the speaker related to the section search criteria acquired at S50, according to the voice recognition result of S52. Such detection is performed with respect to the plurality of call data subjected to the voice recognition at S52. In the case where the section search criteria that requires the voice recognition has not been acquired at S50, the step of S53 is skipped.

The call analysis server 10 excludes from the object of analysis the call data (S54) that does not match the criteria acquired at S50 in the plurality of call data subjected to the voice recognition at S52, according to the voice recognition result of S52. The call analysis server 10 also excludes the call data from which the specific utterance section has not been detected at the step of S53 from the object of analysis.

Then the call analysis server 10 decides whether the emotion recognition has to be performed (S55), on the basis of the criteria acquired at S50. In the call analysis server 10, the information indicating whether the emotion recognition has to be performed is stored in advance, with respect to each of the call search criteria and the section search criteria.

The call analysis server 10 performs the emotion recognition (S56) according to the decision (YES in S55), with respect to the plurality of call data that has been acquired in advance or the call data extracted as object of analysis at S54. The emotion recognition includes, as described above, whether each of the utterance sections represents the specific event originating from the speaker related to the criteria acquired at S50. For example, the call analysis server 10 selects the identification model associated with the criteria acquired at S50, and performs the emotion recognition using the selected identification model.

The call analysis server 10 detects the specific utterance sections (S57) representing the specific event originating from the speaker related to the section search criteria, according to the emotion recognition result of S56. Such detection is performed with respect to the plurality of call data subjected to the emotion recognition at S56. The call analysis server 10 then narrows down the call data (S58) on the basis of the detection result of S57. In other words, the call analysis server 10 excludes the call data from which the specific utterance section has not been detected at S57, from the object of analysis.

The call analysis server 10 decides whether there are any specific utterance sections detected through the foregoing steps (S59). When the specific utterance section is present (YES in S59), the call analysis server 10 identifies at least one reference time point in the specific utterance section of each call. This identification is made with respect to each of the section search criteria, utilizing the specific identification method appropriate for that section search criteria (S60). The specific identification method is as described above.

The call analysis server 10 determines the cause analysis section for the dissatisfaction of the customer on the basis of the reference time point, in each call (S61). When a plurality of section search criteria have been acquired, the call analysis server 10 detects the overlapping section between the cause analysis sections associated with the respective section search criteria. Then the call analysis server 10 determines the overlapping section as the final cause analysis section for the dissatisfaction of the customer.

The call analysis server 10 generates the drawing data in which a plurality of first drawing elements and the second drawing element are each aligned in a chronological order. The drawing data is generated with respect to each conversation related to the call data extracted as object of analysis, or the call data that has been acquired in advance through the foregoing process. The first drawing elements respectively represent the plurality of specific utterance sections detected at least at one of S53 and S57, and the second drawing element represents the cause analysis section determined at S61. The call analysis server 10 then causes the display device to display the analysis result screen based on such drawing data (S62).

Although a plurality of steps are sequentially listed in the flowchart of FIG. 5, the process according to this exemplary embodiment is not limited to the sequence shown in FIG. 5. For example, in the case where the plurality of section search criteria have been acquired, the steps S52 to S54 and the steps S56 to S58 may be performed in parallel, with respect to each of the section search criteria.

Advantageous Effects of First Exemplary Embodiment

In the first exemplary embodiment, as described above, the specific utterance sections each representing one specific event originating from one speaker related to the section search criteria are detected, with respect to each of the section search criteria. In many cases, a plurality of such specific utterance sections are contained in the call in which the speaker is producing the specific event. Accordingly, it is not efficient to analyze all of the specific utterance sections that have been detected as above. In this exemplary embodiment, therefore, at least one reference time point is identified on the basis of the plurality of specific utterance sections. The reference time point is identified by utilizing the specific method provided in advance for each of the section search criteria, i.e., each of the specific events of the speaker. Accordingly, with respect to a plurality of continuous specific utterance sections, a reference point (reference time point) is set in the vicinity of a certain time point in the combined section formed by those sections. When the continuous specific utterance sections represent the anger of the customer for example, the reference time point is set in the vicinity of the head portion of the section. With respect to the specific utterance sections that do not frequently appear but are likely to contain the cause of the dissatisfaction of the customer, for example deep apology of the operator, such specific utterance sections are each set as the reference point (reference time point). Then a specific time range defined about the reference time point is determined as cause analysis section for the dissatisfaction of the customer.

Thus, according to the first exemplary embodiment, the analysis is not performed with respect to all of the specific utterance sections representing the specific event originating from the speaker. Instead, only the sections that are highly likely to contain the cause of the dissatisfaction of the customer are picked up as object of analysis. Therefore, the efficiency of the cause analysis can be improved.

In the first exemplary embodiment, further, information processing is performed to determine the cause analysis section. The information processing reflects the generation characteristics of the specific event originating from the speaker, such as the anger of the customer and deep apology of the operator. In addition, when a plurality of section search criteria are designated, the overlapping range between the cause analysis sections determined using the respective specific utterance sections based on the section search criteria, is determined as final cause analysis section.

The mentioned arrangement according to the first exemplary embodiment increases the probability that an event representing the dissatisfaction of the customer is contained in the finally determined cause analysis section.

Still further, in the first exemplary embodiment a plurality of specific utterance sections representing at least one specific event originating from at least one speaker are outputted, with respect to each call. In addition, the cause analysis section for the dissatisfaction of the customer determined on the basis of the plurality of specific utterance sections is outputted as well. With the first exemplary embodiment, therefore, the distribution of the specific utterance sections representing the specific event originating from the speaker can be confirmed, with respect to each call. At the same time, the position of the cause analysis section for the dissatisfaction of the customer can also be confirmed. Such a configuration facilitates recognition of the outline of the overall conversation regarding the dissatisfaction of the customer, as well as the utterance status in the vicinity of the cause analysis sections. Further, the configuration according to the first exemplary embodiment facilitates the analysis as to which of the specific events originating from which of the speakers is more useful for identifying the position where the cause of the dissatisfaction of the customer lies.

Hereunder, the first exemplary embodiment will be described in further details, with reference to examples cited below. Here, the present invention is in no way limited to the following examples.

EXAMPLE 1

SCREEN EXAMPLES

Figure 6:
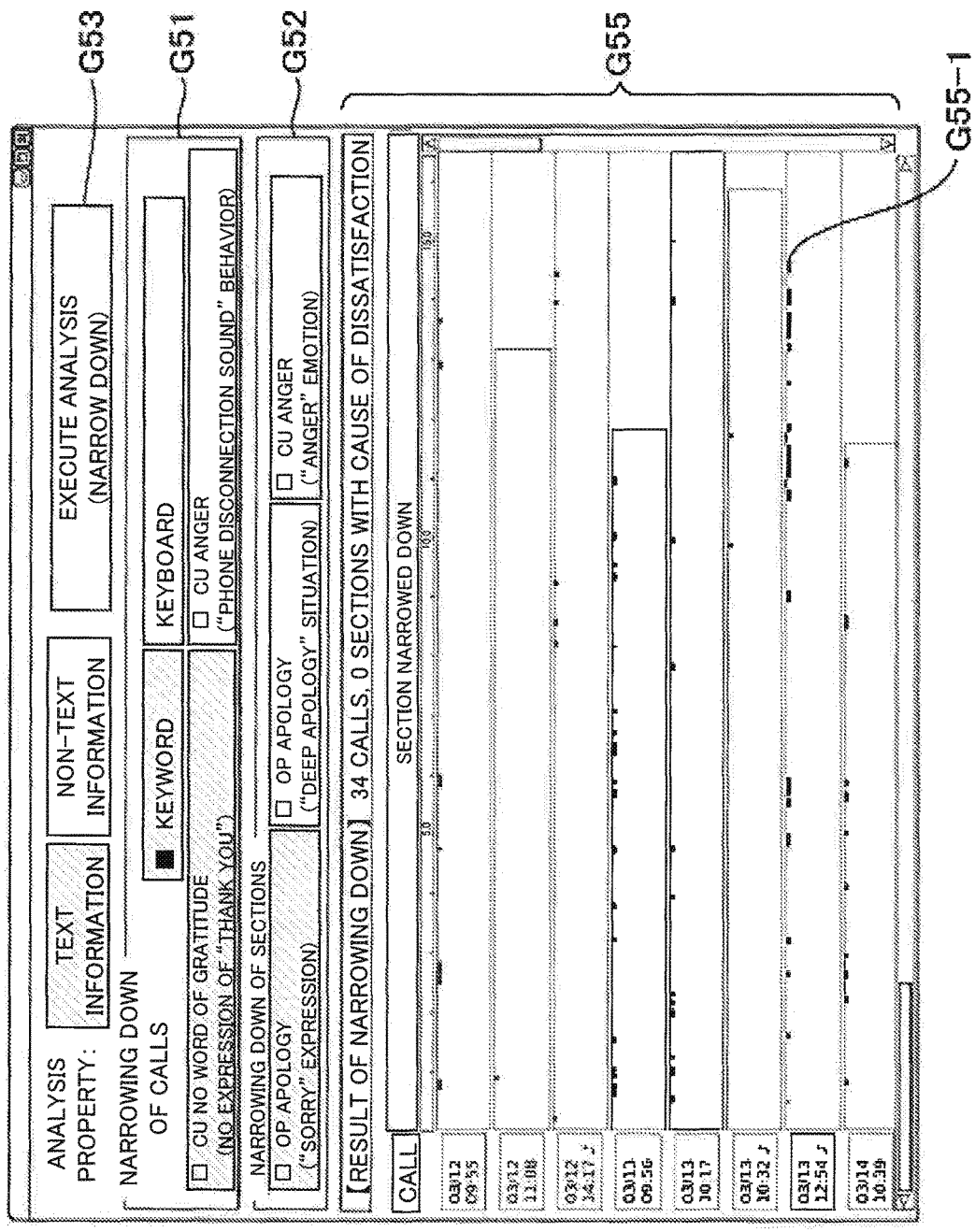
FIG. 6 is a schematic drawing showing an example of analysis screen according to a example 1.
Figure 7:
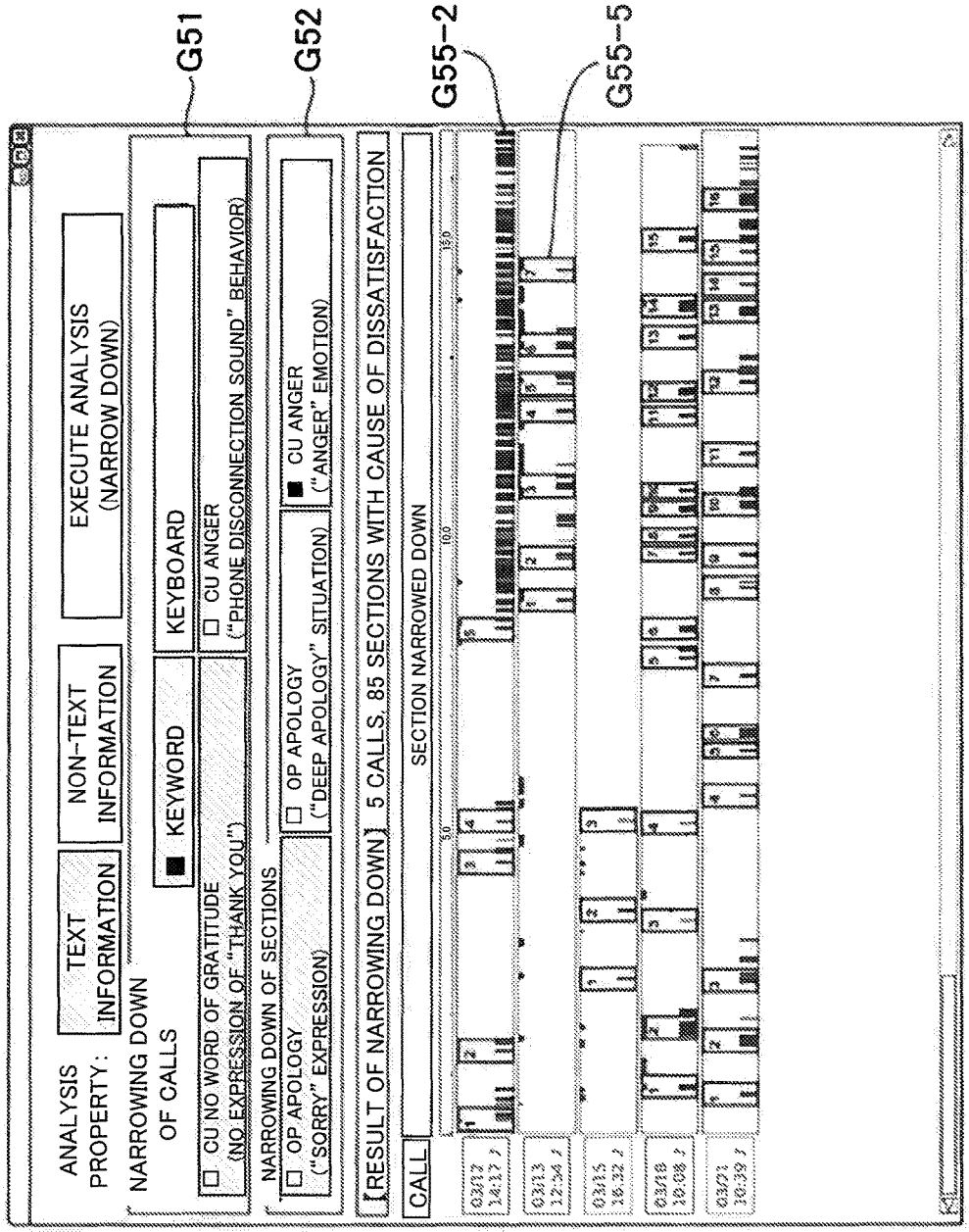
FIG. 7 is a schematic drawing showing another example of analysis screen according to example 1.
Figure 8:
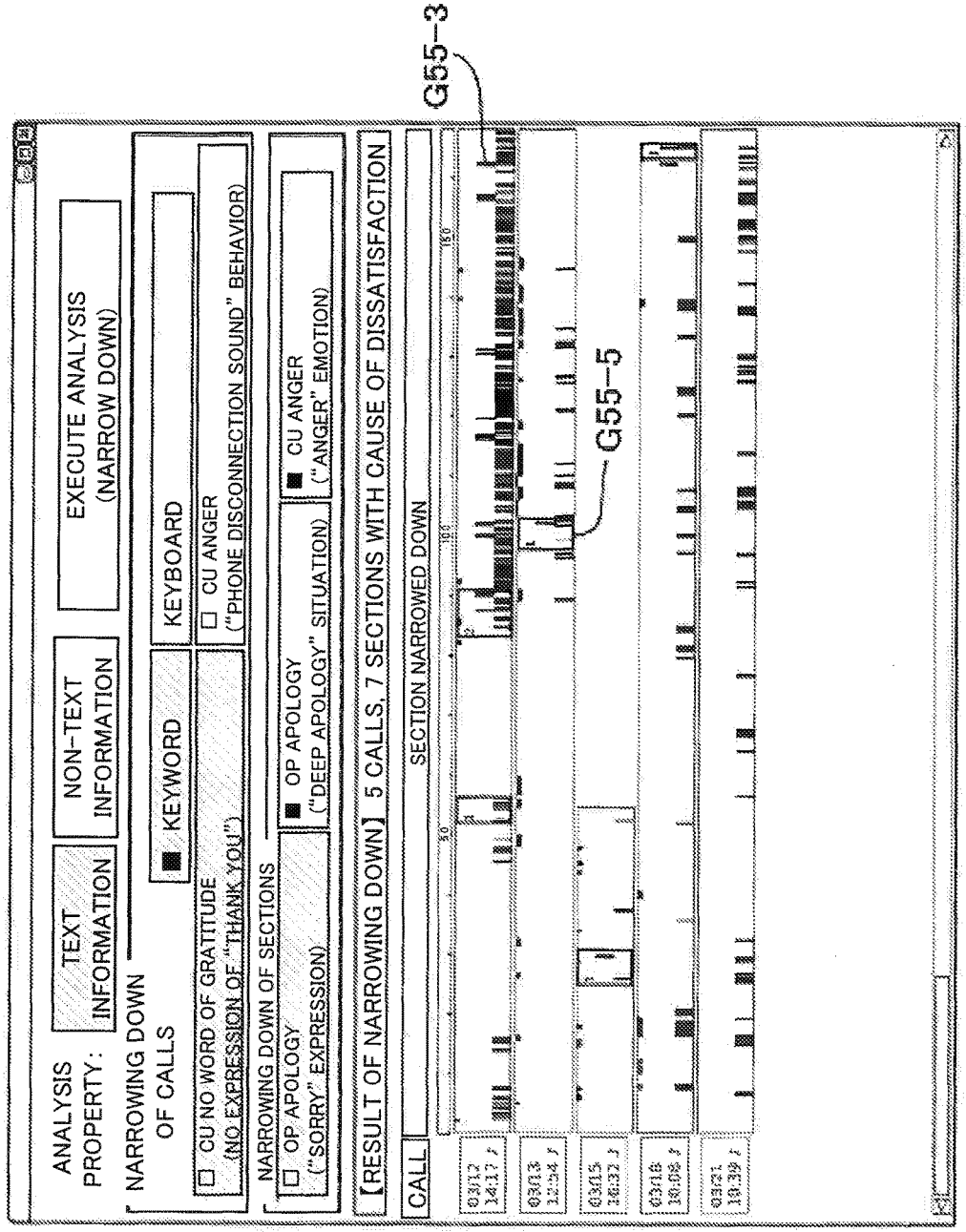
FIG. 8 is a schematic drawing showing still another example of analysis screen according to example 1.

FIG. 6, FIG. 7, and FIG. 8 are schematic drawings each showing an example of analysis screen according to example 1. The analysis screens illustrated in FIG. 6 to FIG. 8 include the analysis result screen displayed by the display processing unit 25 of the first exemplary embodiment, and the input screen for the call search criteria and the section search criteria. The analysis screen includes a call search criteria designation area G51, a section search criteria designation area G52, an analysis execution button G53, and an analysis result display area G55. The columns G51, G52, and G53 relate to the input screen, and the column G55 relates to the analysis result screen.

The call search criteria designation area G51 and the section search criteria designation area G52 display the respective criteria. The display enables distinction as to which of the analysis properties is employed for the decision, the voice text data or the voice data. For example, "keyword" and "CU no word of gratitude" for the call search criteria, and "OP apology ("sorry" expression)" for the section search criteria are decided on the basis of the voice text data only, in accordance with the analysis property. In addition, "CU anger ("phone disconnection sound" behavior)", for the call search criteria, and "OP apology (deep apology)" and "CU anger ("anger" emotion)" for the section search criteria are decided on the basis of the voice data. Here, CU stands for the customer and OP stands for the operator.

The analysis result display area G55 displays in each line the call represented by the call data extracted by the detection unit 22 as object of analysis, out of the plurality of call data acquired by the call data acquisition unit. At the left end of each call column of the analysis result display area G55 the date and time that the call started is displayed, and the chronological order of the call is indicated from the left to the right in the drawings. Further, in each call column in the analysis result display area G55, the specific utterance section detected on the basis of the relevant section search criteria, and the utterance section containing the keyword given as call search criteria are displayed in separate lines. In FIG. 6, the region indicating the utterance section containing the keyword is displayed in color in the uppermost line of the call column (G55-1 in FIG. 6). In FIG. 7, the region indicating the specific utterance section representing "CU anger ("anger" emotion)" is displayed in color in the lowermost line of the call column (G55-2 in FIG. 7), in addition to the region indicating the utterance section containing the keyword (G55-1 in FIG. 6). In FIG. 8, the region indicating the specific utterance section representing "OP apology ("deep apology" situation)" is displayed in the second lowest line of the call column (G55-3 in FIG. 8). FIG. 8 also includes the region indicating the utterance section containing the keyword (G55-1 in FIG. 6) and the region indicating the specific utterance section representing "CU anger ("anger" emotion)" (G55-2 in FIG. 7).

Further, as shown in FIG. 7 and FIG. 8, the cause analysis section for the dissatisfaction of the customer determined by the object determination unit 24 is displayed in each call column of the analysis result display area G55. The time range of the cause analysis section is also displayed (G55-5). In addition, the identification information (numerals in the example of FIG. 7 and FIG. 8) for identifying the cause analysis section is specified in the chronological order of the call, in the cause analysis sections displayed in the respective call columns.

Thus, in the analysis result screen displayed in example 1, the specific utterance section that matches the section search criteria, and the cause analysis section determined on the basis of the specific utterance section are displayed, with respect to each call. With the configuration according to example 1, therefore, the distribution of the specific utterance sections representing the specific event originating from the speaker can be confirmed with respect to each call. At the same time, the position of the cause analysis section for the specific emotion can also be confirmed. Such a configuration facilitates recognition of the outline of the overall conversation regarding the dissatisfaction of the customer, as well as the utterance status in the vicinity of the cause analysis sections.

The display processing unit 25 may also display a screen for specifically confirming the content of the conversation as exemplified in FIG. 9, in addition to the analysis screen illustrated in FIG. 6 to FIG. 8. FIG. 9 illustrates an example of the call detail confirmation screen according to example 1. For example, when a call is selected in the analysis screen shown in FIG. 6 to FIG. 8, the display processing unit 25 displays the call detail confirmation screen related to the selected call.

In the example shown in FIG. 9, the date and time that the call was made is indicated in an upper region of the screen. The subject of inquiry is, for example, the data inputted by the operator through the operator terminal 7, and is acquired by the call data acquisition unit 20 together with the call data. The call detail confirmation screen also includes an utterance information display area G81. The utterance information display area G81 displays each of the utterance sections in a line, together with the start time G81-1, the distinction of the speaker (OP or CU) G81-2, and voice text data G81-3 of the relating utterance section. The voice text data G81-3 is the data acquired by the voice recognition unit 27 as described above. When the entirety of the information of the utterance section is unable to be displayed at a time, the utterance information display area G81 can be scrolled so as to display the entirety of the information.

In addition, the utterance section included in the cause analysis section for the dissatisfaction of the customer determined by the object determination unit 24 is displayed distinctively from other utterance sections. In the example shown in FIG. 9, such an utterance section is marked with a bold frame (G81-5). Further, though not shown in FIG. 9, the specific utterance sections associated with the section search criteria are distinctively displayed in color. Accordingly, the user can easily identify the specific cause that made the customer dissatisfied, by confirming the detail of the utterance in the cause analysis section and the vicinity thereof. Further, the call detail confirmation screen includes a list of identification information of the cause analysis section for the dissatisfaction of the customer determined by the object determination unit 24 (G82). The display processing unit 25 detects a selecting operation of the identification information, and automatically scrolls the utterance information display area G81 so as to display the utterance section identified on the basis of the selected identification information. In addition, when a line in the utterance information display area G81 is selected, the voice of the utterance section in the selected line may be reproduced. Therefore, the user can immediately confirm the detail of the utterance in the cause analysis section and the vicinity thereof estimated to be the cause of the dissatisfaction of the customer by the call analysis server 10, to efficiently perform the cause analysis.

Hereunder, the operation of the call analysis server 10 for displaying the analysis result display area G55, i.e., the analysis result screen will be described with reference to each of FIG. 6, FIG. 7, and FIG. 8.

In FIG. 6, the keyword "keyboard" is designated as call search criteria (call search criteria designation area G51). Accordingly, the call analysis server 10 acquires the keyword "keyboard" as call search criteria. Then the call analysis server 10 extracts the call data containing the keyword "keyboard" as call data that matches the call search criteria, out of the voice text data representing the utterance sections of the customer acquired by the voice recognition unit 27. Therefore, the analysis result display area G55 displays only the calls containing the utterance sections that include the keyword. Then the call analysis server 10 identifies the utterance sections that include the keyword (not yet called specific utterance section), and displays in color the region indicating the utterance sections that include the keyword in each of the calls.

In FIG. 7, "CU anger ("anger" emotion)" is designated as section search criteria (section search criteria designation area G52), in addition to the call search criteria (keyword "keyboard") in FIG. 6. Accordingly, the call analysis server 10 acquires the call search criteria (keyword "keyboard") and the section search criteria "CU anger ("anger" emotion) ". The call analysis server 10 then extracts the call data containing the keyword "keyboard" as call data that matches the call search criteria, out of the voice text data representing the utterance sections of the customer acquired by the voice recognition unit 27. Further, the call analysis server 10 identifies, as specific utterance section, the utterance sections that the emotion recognition unit 29 has decided as expressing "anger", among the utterance sections of the customer in the extracted call data. The call analysis server 10 also excludes the call data from which the specific utterance section has not been detected, from the object of extraction. Then the call analysis server 10 identifies the reference time point utilizing the specific utterance section representing the anger of the customer, and determines the cause analysis section for the dissatisfaction of the customer, on the basis of the reference time point. Since the specific utterance sections representing the anger of the customer continuously appear in some regions, the call analysis server 10 identifies the reference time point with respect to the leading one of the specific utterance sections in the region.

In FIG. 8, "OP apology ("deep apology" situation)" is designated as section search criteria (section search criteria designation area G52), in addition to the call search criteria (keyword "keyboard") and the section search criteria (CU anger) in FIG. 7. Accordingly, the call analysis server 10 acquires the call search criteria (keyword "keyboard"), the section search criteria "CU anger ("anger" emotion)", and the section search criteria "OP apology ("deep apology" situation)". The process with respect to the section search criteria "OP apology ("deep apology" situation)" is performed as follows. First, the call analysis server 10 identifies the utterance sections of the operator containing apology expression data stored in the specific expression table 28, on the basis of the voice text data of the operator acquired by the voice recognition unit 27. Then, the call analysis server 10 then identifies the utterance sections that the emotion recognition unit 29 has decided as expressing "deep apology" among the utterance sections thus identified, as specific utterance section that matches the section search criteria. The call analysis server 10 then determines the following section as final cause analysis section. The section is the overlapping range between the cause analysis section determined using the reference time point of the specific utterance sections representing the anger of the customer, and the cause analysis section determined using the reference time point of the specific utterance section representing the deep apology of the operator.

As is apparent through comparison between FIG. 7 and FIG. 8, according to example 1 increasing the section search criteria, i.e., the specific events of the speaker enables the number of the cause analysis sections to be reduced. This is because increasing the section search criteria leads to an increase in the number of materials for determining the cause analysis section. As a result, higher probability that the cause analysis section contains the event related to the cause of the dissatisfaction of the customer can be provided. Consequently, higher efficiency can be achieved in the cause analysis with respect to the specific event originating from the speaker in the phone conversation.

[Addendum]

In the first exemplary embodiment and example 1, when the specific utterance sections representing a specific event of a speaker continuously appear, the cause analysis section is determined on the basis of a part (head portion) of those specific utterance sections, as shown in FIG. 3 and FIG. 4. However, even when the specific utterance sections appear continuously, the first exemplary embodiment and example 1 may also include the case where the cause analysis sections are determined on the basis of the respective specific utterance sections, depending on the designated section search criteria, i.e., the specific event originating from the speaker. In this case, the cause analysis section can be narrowed down from all the specific utterance sections. To do so, the overlapping range between the cause analysis sections based on the respectively designated section search criteria is determined as final cause analysis section for the dissatisfaction of the customer in the relevant call.

[Variation]

In the first exemplary embodiment and example 1, the following section is determined as final cause analysis section for the dissatisfaction of the customer in the relevant call, when a plurality of section search criteria are designated. The section is an overlapping range between the cause analysis sections determined on the basis of the respective reference time points obtained using the section search criteria. However, all of the cause analysis sections determined on the basis of the respective section search criteria may be determined as final cause analysis section, without limitation to the overlapping range. In this case also, the cause analysis section can be narrowed down on the basis of the identified reference time point with respect to the continuous specific utterance section. Therefore, the analysis efficiency can be improved, compared with the case of analyzing all the utterance sections or all the specific utterance sections.

The call analysis server 10 may be set up with a plurality of computers. For example, the detection unit 22 may be realized on at least one other computer. In this case, the call analysis server 10 may provide the detection unit 22 with the information about the call search criteria and the section search criteria. Then the call analysis server 10 may acquire the start time and the finish time of the specific utterance sections from the detection unit 22.

Other Exemplary Embodiment

The call data is the subject of the foregoing exemplary embodiment and example. However, the analysis object determination device and the analysis object determination method may be applied to devices or systems that handle call data other than the phone conversation. In this case, for example, a recorder for recording the conversation to be analyzed is installed in the site where the conversation takes place such as a conference room, a bank counter, a cash register of a shop. When the call data is recorded in a form of mixture of voices of a plurality of conversation participants, the data may be subjected to specific voice processing, so as to split the data into voice data of each of the conversation participants.

The foregoing exemplary embodiment and the variations thereof may be combined as desired, provided that a conflict does not arise.

A part or the whole of the foregoing exemplary embodiment and the variations thereof may be defined as supplemental notes cited hereunder. However, the exemplary embodiment and the variations are not limited to the following supplemental notes.

[Supplemental Note 1]

An analysis object determination device including:

a detection unit which detects a plurality of specific utterance sections on the basis of data related to a voice in a conversation, the specific utterance sections representing a plurality of specific events originating from one or a plurality of participants in the conversation, or a specific event originating from one of the conversation participants; and an object determination unit which determines, on the basis of the plurality of specific utterance sections detected by the detection unit, one or more cause analysis sections for the specific event originating from the conversation participant, the number of the cause analysis sections being fewer than the number of the plurality of specific utterance sections.

[Supplemental Note 2]

The device according to supplemental note 1, further including an identification unit which identifies at least one reference time point with at least one method related to at least one specific event represented by the plurality of specific utterance sections detected by the detection unit, in which the object determination unit determines, as the cause analysis section, a specific time range defined about the at least one reference time point identified by the identification unit.

[Supplemental Note 3]

The device according to supplemental note 2, in which the identification unit identifies, when the plurality of specific utterance sections detected by the detection unit includes a plurality of first specific utterance sections each representing one specific event originating from one of the participants of the conversation, the at least one reference time point in a combined section including pairs of first specific utterance sections adjacent to each other, in the plurality of first specific utterance sections, a time width between the first specific utterance sections adjacent to each other being shorter than a specific time.

[Supplemental Note 4]

The device according to supplemental note 3, in which the identification unit further identifies, when the plurality of specific utterance sections detected by the detection unit further includes a second specific utterance section in addition to the plurality of first specific utterance sections, a reference time point utilizing the second specific utterance section as it is, the second specific utterance section representing another specific event originating from the conversation participant, different from the specific event of the same conversation participant represented by the plurality of first specific utterance sections, or a specific event originating from another conversation participant, and the object determination unit further determines a specific time range defined about a reference time point obtained on the basis of the second specific utterance section, as the cause analysis section.

[Supplemental Note 5]

The device according to supplemental note 2, in which the identification unit further identifies, when the plurality of specific utterance sections detected by the detection unit includes a first specific utterance section and a second specific utterance section, the at least one reference time point utilizing the first specific utterance section and the second specific utterance section as they are, the first specific utterance section representing a specific event originating from one of the conversation participants, and the second specific utterance section representing another specific event originating from the conversation participant, different from the specific event of the same conversation participant represented by the first specific utterance sections, or a specific event originating from another conversation participant, and the object determination unit determines specific time ranges respectively defined about reference time points obtained on the basis of the first specific utterance section and the second specific utterance section, as the cause analysis section.

[Supplemental Note 6]

The device according to supplemental note 4 or 5, in which the object determination unit determines an overlapping section between the cause analysis section determined on the basis of the reference time point obtained from the first specific utterance section and the cause analysis section determined on the basis of the reference time point obtained from the second specific utterance section, as the cause analysis section.

[Supplemental Note 7]

The device according to supplemental note 4 or 6, in which the detection unit detects the plurality of first specific utterance sections representing dissatisfaction of a first conversation participant and the second specific utterance section representing apology of a second conversation participant, and the object determination unit determines the cause analysis section with respect to the dissatisfaction of the first conversation participant.

[Supplemental Note 8]

The device according to any one of supplemental notes 1 to 7, further including a drawing data generation unit which generates drawing data in which a plurality of first drawing elements and a second drawing element are aligned in a chronological order in the conversation, the first drawing elements respectively representing the plurality of specific utterance sections detected by the detection unit, and the second drawing element representing the cause analysis section determined by the object determination unit.

[Supplemental Note 9]

The device according to supplemental note 8, in which the drawing data generation unit generates drawing data for displaying (i) a plurality of voice text data representing a plurality of utterance sections in the conversation in a chronological order in the conversation with respect to each of the utterance sections, (ii) the voice text data representing the utterance section included in the cause analysis section, distinctively from other data, and (iii) identification information of the cause analysis section, and enables transition of a screen so as to display the voice text data representing the utterance section included in the cause analysis section identified by the identification information, in accordance with operation of a user with respect to the identification information on the screen displaying the drawing data.

[Supplemental Note 10]

An analysis object determination method performed with at least one computer, the method including:

detecting a plurality of specific utterance sections using data related to a voice in a conversation, the specific utterance sections representing a plurality of specific events originating from one or a plurality of participants in the conversation, or a specific event originating from one conversation participant; and determining, on the basis of the plurality of specific utterance sections detected by the detection unit, one or more cause analysis sections for the specific event originating from the conversation participant, the number of the cause analysis sections being fewer than the number of the plurality of specific utterance sections.

[Supplemental Note 11]

The method according to supplemental note 10, further including:

identifying at least one reference time point with at least one method related to at least one specific event represented by the plurality of specific utterance sections detected by the detection unit; and determining, as the cause analysis section, a specific time range defined about the at least one reference time point identified by the identification unit.

[Supplemental Note 12]

The method according to supplemental note 11, in which the identifying the reference time point includes identifying, when the plurality of specific utterance sections detected includes a plurality of first specific utterance sections each representing one specific event originating from one of the participants of the conversation, the at least one reference time point in a combined section including pairs of first specific utterance sections adjacent to each other, in the plurality of first specific utterance sections, a time width between the first specific utterance sections adjacent to each other being shorter than a specific time.

[Supplemental Note 13]

The method according to supplemental note 12, in which the identifying the reference time point includes:

further identifying, when the plurality of specific utterance sections detected further includes a second specific utterance section in addition to the plurality of first specific utterance sections, a reference time point utilizing the second specific utterance section as it is, the second specific utterance section representing another specific event originating from the conversation participant, different from the specific event of the same conversation participant represented by the plurality of first specific utterance sections, or a specific event originating from another conversation participant; and further determining a specific time range defined about a reference time point obtained on the basis of the second specific utterance section, as the cause analysis section.

[Supplemental Note 14]

The method according to supplemental note 13, in which the identifying the reference time point includes:

identifying, when the plurality of specific utterance sections detected includes a first specific utterance section and a second specific utterance section, the at least one reference time point utilizing the first specific utterance section and the second specific utterance section as they are, the first specific utterance section representing a specific event originating from one of the conversation participants, and the second specific utterance section representing another specific event originating from the conversation participant, different from the specific event of the same conversation participant represented by the first specific utterance sections, or a specific event originating from another conversation participant; and determining specific time ranges respectively defined about reference time points obtained on the basis of the first specific utterance section and the second specific utterance section, as the cause analysis section.

[Supplemental Note 15]

The method according to supplemental note 13, in which the determining the cause analysis section includes determining an overlapping section between the cause analysis section determined on the basis of the reference time point obtained from the first specific utterance section and the cause analysis section determined on the basis of the reference time point obtained from the second specific utterance section, as the cause analysis section.

[Supplemental Note 16]

The method according to supplemental note 13 or 15, in which the detecting the specific utterance section includes detecting the plurality of first specific utterance sections representing dissatisfaction of a first conversation participant and the second specific utterance section representing apology of a second conversation participant, and the determining of the cause analysis section includes determining the cause analysis section with respect to the dissatisfaction of the first conversation participant.

[Supplemental Note 17]

The method according to any one of supplemental notes 10 to 16, further including generating drawing data in which a plurality of first drawing elements and a second drawing element are aligned in a chronological order in the conversation, the first drawing elements respectively representing the plurality of specific utterance sections detected by the detection unit, and the second drawing element representing the cause analysis section determined by the object determination unit.

[Supplemental Note 18]

The method according to supplemental note 17, in which the generating the drawing data includes generating the drawing data for displaying (i) a plurality of voice text data representing a plurality of utterance sections in the conversation in a chronological order in the conversation with respect to each of the utterance sections, (ii) the voice text data representing the utterance section included in the cause analysis section, distinctively from other data, and (iii)

identification information of the cause analysis section, thereby enabling transition of a screen while displaying the voice text data representing the utterance section included in the cause analysis section identified by the identification information, in accordance with operation of a user with respect to the identification information on the screen displaying the drawing data.

[Supplemental Note 19]

A program that causes at least one computer to execute the analysis object determination method according to any one of supplemental notes 10 to 18.

[Supplemental Note 20]

A computer-readable recording medium containing the program according to supplemental note 19.

This application claims priority based on Japanese Patent Application No. 2012-240742 filed on Oct. 31, 2012, the entire content of which is incorporated hereinto by reference.

What is claimed is:

1. An analysis object determination device comprising
a memory storing instructions; and
at least one processor configured to process the instructions to:
acquire a plurality of call data;
acquire one or more call search criteria to narrow down call data to calls matching the search criteria;
detect a plurality of specific utterance sections on the basis of data related to a voice in a conversation of the narrowed down call data, the specific utterance sections corresponding to each of a plurality of types of specific events originating from one or a plurality of participants in the conversation;
exclude the narrowed down call data that does not include the specific utterances;
identify, within the narrowed down call data that were not excluded, at least one reference time point including a point at which a cause of a specific event may have occurred, related to at least one specific event represented by the plurality of specific utterance sections detected;
determine, on the basis of the plurality of specific utterance sections detected and within the narrowed down call data that were not excluded, one or more cause analysis sections relating to the specific event originating from the conversation participant, the number of the cause analysis sections being fewer than the number of the plurality of specific utterance sections, when determining, as the cause analysis section, a specific time range defined about the at least one reference time identified;
present a user interface categorizing results of the speech analysis, the user interface permitting a user to search for particular cause analysis sections causing the particular emotion of the specific utterance section within the conversation by keyword, and permitting the user to narrow down the cause analysis sections by categories, the user interface presenting the user with specific locations in which the cause analysis sections are located in the conversation;
detect a plurality of first specific utterance sections representing dissatisfaction of a first conversation participant and a second specific utterance section representing apology of a second conversation participant;
determine a cause analysis section with respect to the dissatisfaction of the first conversation participant,
wherein in speech analysis of the conversation, the specific utterance sections correspond to a particular emotion of the one of the participants in the conversation, and the cause analysis sections correspond to parts of the conversation causing the particular emotion, such that determination of the cause analysis sections solves a speech analysis technical problem of locating the cause analysis sections causing the particular emotion of the specific utterance sections within the conversation,
wherein in identifying at least one reference time point, the reference time point is identified so as to include a head portion of the combined section,
wherein the parts of the conversation causing the particular emotion are different than the specific utterance sections corresponding to the particular emotion,
wherein the user interface includes a plurality of call columns within an analysis result display area within which the cause analysis sections are displayed, the identification information displayed in the user interface in chronological order of the calls, and
wherein the parts of the conversation causing the particular emotion are analysis results, complaints within the calls dealt with based on the analysis results.

2. The device according to claim 1,
wherein the at least one processor is configured to process the instructions to identify, when the plurality of specific utterance sections detected includes a plurality of first specific utterance sections each representing one specific event originating from one of the participants of the conversation, the at least one reference time point in a combined section including pairs of first specific utterance sections adjacent to each other, in the plurality of first specific utterance sections, a time width between the first specific utterance sections adjacent to each other being shorter than a specific time.

3. The device according to claim 2,
wherein the at least one processor is configured to process the instructions to further identify, when the plurality of specific utterance sections detected further includes a second specific utterance section in addition to the plurality of first specific utterance sections, a reference time point utilizing the second specific utterance section, the second specific utterance section representing another specific event originating from the conversation participant, different from the specific event of the same conversation participant represented by the plurality of first specific utterance sections, or a specific event originating from another conversation participant, and
the at least one processor is configured to process the instructions to further determine a specific time range defined about a reference time point obtained on the basis of the second specific utterance section, as the cause analysis section.

4. The device according to claim 3,
wherein the at least one processor is configured to process the instructions to determine an overlapping section between the cause analysis section determined on the basis of the reference time point obtained from the first specific utterance section and the cause analysis section determined on the basis of the reference time point obtained from the second specific utterance section, as the cause analysis section.

5. The device according to claim 1,
wherein the at least one processor is configured to process the instructions to identify, when the plurality of specific utterance sections detected includes a first specific utterance section and a second specific utterance section, the at least one reference time point utilizing the first specific utterance section and the second specific utterance section, the first specific utterance section representing a specific event originating from one of the conversation participants, and the second specific utterance section representing another specific event originating from the conversation participant, different from the specific event of the same conversation participant represented by the first specific utterance sections, or a specific event originating from another conversation participant, and the at least one processor is configured to process the instructions to determine specific time ranges respectively defined about reference time points obtained on the basis of the first specific utterance section and the second specific utterance section, as the cause analysis section.

6. The device according to claim 1, wherein the at least one processor is configured to process the instructions to generate drawing data in which a plurality of first drawing elements and a second drawing element are aligned in a chronological order in the conversation, the first drawing elements respectively representing the plurality of specific utterance sections detected, and the second drawing element representing the cause analysis section determined.

7. The device according to claim 6,
wherein the at least one processor is configured to process the instructions to generate the drawing data for displaying
a plurality of voice text data representing a plurality of utterance sections in the conversation in a chronological order in the conversation with respect to each of the utterance sections,
the voice text data representing the utterance section included in the cause analysis section, distinctively from other data, and
identification information of the cause analysis section, and enables transition of a screen so as to display the voice text data representing the utterance section included in the cause analysis section identified by the identification information, in accordance with operation of a user with respect to the identification information on the screen displaying the drawing data.

8. An analysis object determination method, the method comprising:
acquiring, by a computing device, a plurality of call data;
acquiring, by the computing device, one or more call search criteria to narrow down call data to cabs matching the search criteria;
detecting, by the computing device, a plurality of specific utterance sections on the basis of data related to a voice in a conversation of the narrowed down call data, the specific utterance sections corresponding to each of a plurality of types of specific events originating from one or a plurality of participants in the conversation;
excluding, by the computing device, the narrowed down call data that does not include the specific utterances;
identifying, by the computing device, within the narrowed down call data that were not excluded, at least one reference time point including a point at which a cause of a specific event may have occurred, related to at least one specific event represented by the plurality of specific utterance sections detected;
determining, by the computing device, on the basis of the plurality of specific utterance sections detected and within the narrowed down call data that were not excluded, one or more cause analysis sections relating to the specific event originating from the conversation participant, the number of the cause analysis sections being fewer than the number of the plurality of specific utterance sections, when determining, as the cause analysis section, a specific dine range defined about the at least one reference time identified;
presenting, by the computing device, a user interface categorizing results of the speech analysis, the user interface permitting a user to search for particular cause analysis sections causing the particular emotion of the specific utterance section within the conversation by keyword, and permitting the user to narrow down the cause analysis sections by categories, the user interface presenting the user with specific locations in which the cause analysis sections are located in the conversation;
detecting, by the computing device, a plurality of first specific utterance sections representing dissatisfaction of a first conversation participant and a second specific utterance section representing apology of a second conversation participant;
determining, by the computing device, a cause analysis section with respect to the dissatisfaction of the first conversation participant,
wherein in speech analysis of the conversation, the specific utterance sections correspond to a particular emotion of the one of the participants in the conversation, and the cause analysis sections correspond to parts of the conversation causing the particular emotion, such that determination of the cause analysis sections solves a speech analysis technical problem of locating the cause analysis sections causing the particular emotion of the specific utterance sections within the conversation,
wherein in identifying at least one reference time point, the reference time point, is identified so as to include a head portion of the combined section,
wherein the parts of the conversation causing the particular emotion are different than the specific utterance sections corresponding to the particular emotion,
wherein the user interface includes a plurality of call columns within an analysis result display area, within which the cause analysis sections are displayed, the identification information displayed in the user interface in chronological order of the calls, and
wherein the parts of the conversation causing the particular emotion are analysis results, complaints within the calls dealt with based on the analysis results.

9. The method according to claim 8,
wherein the identifying the reference time point includes identifying, when the plurality of specific utterance sections detected includes a plurality of first specific utterance sections each representing one specific event originating from one of the participants of the conversation, the at least one reference time point in a combined section including pairs of first specific utterance sections adjacent to each other, in the plurality of first specific utterance sections, a time width between the first specific utterance sections adjacent to each other being shorter than a specific time.

10. The method according to claim 9,
wherein the identifying the reference time point includes:
further identifying, when the plurality of specific utterance sections detected further includes a second specific utterance section in addition to the plurality of first specific utterance sections, a reference time point utilizing the second specific utterance section as it is, the second specific utterance section representing another specific event originating from the conversation participant, different from the specific event of the same conversation participant represented by the plurality of first specific utterance sections, or a specific event originating from another conversation participant; and further determining a specific time range defined about a reference time point obtained on the basis of the second specific utterance section, as the cause analysis section.

11. The method according to claim 10, wherein the determining the cause analysis section includes determining an overlapping section between the cause analysis section determined on the basis of the reference time point obtained from the first specific utterance section and the cause analysis section determined on the basis of the reference time point obtained from the second specific utterance section, as the cause analysis section.

12. A non-transitory computer-readable medium that stores therein a program for causing a computer that executes the analysis object determination processes, the processes comprising:

acquiring a plurality of call data;

acquiring one or more call search criteria to narrow down call data to calls matching the search criteria;

detecting a plurality of specific utterance sections on the basis of data related to a voice in a conversation of the narrowed down call data, the specific utterance sections corresponding, to each of a plurality of types of specific events originating from one or a plurality of participants in the conversation;

excluding the narrowed down call data that does not include the specific utterances;

identifying within the narrowed down call data that were not excluded, at least one reference time point including a point at which a cause of a specific event may have occurred, related to at least one specific event represented by the plurality of specific utterance sections detected;

determining on the basis of the plurality of specific utterance sections detected and within the narrowed down call data that were not excluded, one or more cause analysis sections relating to the specific event originating from the conversation participant, the number of the cause analysis sections being fewer than the number of the plurality of specific utterance sections, when determining, as the cause analysis section, a specific time range defined about the at least one reference time identified;

presenting, a user interface categorizing results of the speech analysis, the user interface permitting a user to search for particular cause analysis sections causing the particular emotion of the specific utterance section within the conversation by keyword, and permitting the user to narrow down the cause analysis sections by categories, the user interface presenting the user with specific :locations in which the cause analysis sections are located in the conversation;

detecting a plurality of first specific utterance sections representing dissatisfaction of a first conversation participant and a second specific utterance section representing apology of a second conversation participant;

determining a cause analysis section with respect to the dissatisfaction of the first conversation participant, wherein in speech analysis of the conversation, the specific utterance sections correspond to a particular emotion of the one of the participants in the conversation, and the cause analysis sections correspond to parts of the conversation causing the particular emotion, such that determination of the cause analysis sections solves a speech analysis technical problem of locating the cause analysis sections causing the particular emotion of the specific utterance sections within the conversation, wherein in identifying at least one reference time point, the reference time point is identified so as to include a head portion of the combined section, wherein the parts of the conversation causing the particular emotion are different than the specific utterance sections corresponding to the particular emotion, wherein the user interface includes a plurality of call columns within an analysis result display area, within which the cause analysis sections are displayed, the identification information displayed in the user interface in chronological order of the calls, and wherein the parts of the conversation causing the particular emotion are analysis results, complaints within the calls dealt with based on the analysis results.

13. The medium according to claim 12, wherein the identifying the reference time point includes identifying, when the plurality of specific utterance sections detected includes a plurality of first specific utterance sections each representing one specific event originating from one of the participants of the conversation, the at least one reference time point in a combined section including pairs of first specific utterance sections adjacent to each other, in the plurality of first specific utterance sections, a time width between the first specific utterance sections adjacent to each other being shorter than a specific time.

14. The medium according to claim 13, wherein the identifying the reference time point includes:

further identifying, when the plurality of specific utterance sections detected further includes a second specific utterance section in addition to the plurality of first specific utterance sections, a reference time point utilizing the second specific utterance section as it is, the second specific utterance section representing another specific event originating from the conversation participant, different from the specific event of the same conversation participant represented by the plurality of first specific utterance sections, or a specific event originating from another conversation participant; and further determining a specific time range defined about a reference time point obtained on the basis of the second specific utterance section, as the cause analysis section.

15. The medium according to claim 14, wherein the determining the cause analysis section includes determining an overlapping section between the cause analysis section determined on the basis of the reference time point obtained from the first specific utterance section and the cause analysis section determined on the basis of the reference time point obtained from the second specific utterance section, as the cause analysis section.

* * * * *